United States Patent
Uola et al.

(10) Patent No.: US 9,069,876 B2
(45) Date of Patent: Jun. 30, 2015

(54) MEMORY CACHING FOR BROWSER PROCESSES

(75) Inventors: Juha Uola, Tampere (FI); Johan Wikman, Helsinki (FI)

(73) Assignee: Nokia Corporation, Espoo (FI)

( * ) Notice: Subject to any disclaimer, the term of this patent is extended or adjusted under 35 U.S.C. 154(b) by 408 days.

(21) Appl. No.: 13/511,813

(22) PCT Filed: May 25, 2011

(86) PCT No.: PCT/FI2011/050475
§ 371 (c)(1),
(2), (4) Date: Jun. 14, 2012

(87) PCT Pub. No.: WO2012/160241
PCT Pub. Date: Nov. 29, 2012

(65) Prior Publication Data
US 2012/0317363 A1 Dec. 13, 2012

(51) Int. Cl.
*G06F 12/12* (2006.01)
*G06F 17/30* (2006.01)
*G06F 12/08* (2006.01)

(52) U.S. Cl.
CPC ...... *G06F 17/30902* (2013.01); *G06F 12/0806* (2013.01); *G06F 12/084* (2013.01); *G06F 12/122* (2013.01)

(58) Field of Classification Search
CPC .............. G06F 17/30902; G06F 12/08; G06F 12/0806; G06F 12/084; G06F 12/121; G06F 12/122; G06F 9/54
See application file for complete search history.

(56) References Cited

U.S. PATENT DOCUMENTS

| | | | | |
|---|---|---|---|---|
| 6,047,295 A | * | 4/2000 | Endicott et al. | 711/E12.011 |
| 6,122,712 A | * | 9/2000 | Torii | 711/141 |
| 6,370,620 B1 | * | 4/2002 | Wu et al. | 711/132 |
| 6,385,642 B1 | * | 5/2002 | Chlan et al. | 709/203 |
| 7,523,263 B2 | | 4/2009 | Wintergerst | |
| 2006/0200562 A1 | | 9/2006 | de Bonet et al. | |
| 2008/0098173 A1 | * | 4/2008 | Chidambaran et al. | 711/118 |
| 2008/0235452 A1 | * | 9/2008 | Kornegay et al. | 711/120 |
| 2009/0307430 A1 | | 12/2009 | Bruening et al. | |
| 2011/0082984 A1 | | 4/2011 | Yuan | |
| 2011/0208792 A1 | * | 8/2011 | Printezis et al. | 707/819 |

FOREIGN PATENT DOCUMENTS

GB 2420642 A 5/2006

OTHER PUBLICATIONS

Czajkowski et al., "Code Sharing Among Virtual Machines", Proceedings of the 16th European Conference on Object-Oriented Programming, Lecture Notes in Computer Science, vol. 2374, Jun. 2002, 22 pages.

(Continued)

*Primary Examiner* — Michael Krofcheck
(74) *Attorney, Agent, or Firm* — Harrington & Smith

(57) ABSTRACT

There is disclosed a method in which a process is initiated to handle a set of information, which includes one or more resources. In the method the set of information is examined to determine whether the set of information includes a resource stored as a shareable cache element in a memory. If the determination indicates that the set of information includes a resource stored as a shareable cache element, the shareable cache element is used as the resource of the set of information.

20 Claims, 8 Drawing Sheets

(56) References Cited

OTHER PUBLICATIONS

Bruening et al, "Process-Shared and Persistent Code Caches", Proceedings of the fourth ACM SIGPLAN/SIGOPS international conference on Virtual Execution Environments, Mar. 5-7, 2008, pp. 61-70.

Huang et al., "File-Based Sharing for Dynamically Compiled Code on Dalvik Virtual Machine", Transactions of the IRE Professional Group on Audio, vol. 30, 2010, 6 pages.

"WebKit2—Memory Consumption of Process Models vol. #1", WebKit Apocrypha, Retrieved on May 29, 2013, Webpage available at: http://webkit.sed.hu/blog/20110120/webkit2-memory-consumption-process-models-vol-1.

"Let's Take This Offline", Dive Into HTML5, Retrieved on Jun. 11, 2013, Webpage available at: http://diveintohtml5.org/offline.html.

"Library (computing)", From Wikipedia, Retrieved on May 29, 2013, Webpage available at: http://en.wikipedia.org/wiki/Library_%28computing%29#Shared_libraries.

"Copy-on-Write", From Wikipedia, Retrieved on May 29, 2013, Webpage available at: http://en.wikipedia.org/wiki/Copy-on-write.

"Fork (Operating System)", From Wikipedia, Retrieved on May 29, 2013, Webpage available at: http://en.wikipedia.org/wiki/Fork_%28operating_system%29.

"JavaScript Engine", From Wikipedia, Retrieved on May 29, 2013, Webpage available at: http://en.wikipedia.org/wiki/JavaScript_engine.

"Web Browser Engine", From Wikipedia, Retrieved on May 29, 2013, Webpage available at: http://en.wikipedia.org/wiki/Layout_engine.

"WebKit Page Cache I—The Basics", Surfin' Safari, Retrieved on May 29, 2013, Webpage available at: http://www.webkit.org/blog/427/webkit-page-cache-i-the-basics/.

International Search Report and Written Opinion received for corresponding Patent Cooperation Treaty Application No. PCT/FI2011/050475, dated Mar. 12, 2012, 13 pages.

"Implementing KSharedDataCache", Implementing a shared cache: Part 4, Bloggy, Retrieved on Jun. 11, 2013, webpage available at: http://www.purinchu.net/wp/category/programming/implementing-kshareddatacache/.

Matsson et al., "Managing Memory Scalability in WebGardens", A study in efficient inter-process memory usage, May 2009, pp. 1-20.

\* cited by examiner

MEMORY CACHING FOR BROWSER PROCESSES

RELATED APPLICATION

This application was originally filed as PCT Application No. PCT/FI2011/050475 filed May 25, 2011.

TECHNICAL FIELD

The invention relates to a method, an apparatus and a computer program product for managing memory for multiple browser processes.

BACKGROUND INFORMATION

Some devices capable of concurrently running web applications e.g. to display web pages (web sites) may have limited resources wherein to properly run each application without affecting the performance of other applications. Web sites are typically viewed with a browser that manages operating system (OS) process creation based on user browsing actions: typing an address of the web pages such as a uniform resource locator (URL) or a uniform resource indicator (URI), clicking a link, pressing back/forward buttons. Concurrently open sites may be presented as tabs in a browser window. The browser may decide to run each tab in its own operating system process or to run all tabs in a single operating system process.

Creating a new process for each site may increase robustness because the OS takes care of isolating the processes. If a process crashes, it does not affect other processes. A downside may be that each new process consumes resources, especially memory. This is especially problematic for web applications, because dynamic memory allocations done by the browser engine are repeated for each process as is illustrated in Figure Y. The overhead when compared to similar application not created using web-technologies per process can be in the range of, for example, 3-7 MB, which may be a problem on desktop computers and critical on mobile devices. An alternative is to run several applications in a single process, which leads to less overhead per application. However, an application crash may result in process termination, which causes that all the other applications in the same process are also terminated.

Operating systems allow sharing of read-only code e.g. by using shared libraries. However, this mechanism only allows sharing library's read-only memory that remains static for all the processes that share it. Another mechanism that allows sharing dynamic memory is copy-on-write that can be used to share memory when forking a process. When copy-on-write is used, memory segments for a created child process are not allocated from physical memory but the child can use the pages of the parent process until either of them writes to the memory. Thus copying happens only when necessary, which saves memory.

In some embodiments running many browser processes concurrently consumes much memory which may cause some problems to the capability of the device to handle each processes efficiently enough. Each browser process may allocate even several mega bytes of memory, e.g. 3-7 MB, from a heap memory, depending on the complexity of the web site that the browser is showing. However, each browser instance may have significant areas of memory that are identical in each browser process, yet they are not shared. One problem may be to identify and allow sharing these dynamically allocated memory areas between browser process instances. When sharing is in place, another problem may be to allow effectively managing cached resources in the shared memory area.

The copy-on-write mechanism described above allows sharing memory for processes that have a parent-child relationship. Copy-on-write does not work for arbitrary processes even though those processes might be executing identical code. Copy-on-write and shared libraries are operating system level mechanisms that are not tied in any specific executable.

Web browsers may store web documents (e.g., hyper text mark-up language (HTML) pages, images) to reduce bandwidth usage, server load, and perceived lag, when the same resource is requested again. This client side cache can reside in memory or on disk. A server can set certain hypertext transfer protocol (HTTP) cache control headers that aid the client-side web browser in managing the cache. A web browser may have several types of caches and memory areas, such as HTTP cache and HTML5 application cache.

SUMMARY

A method, apparatus and computer program product are therefore provided to enable a mechanism to share and manage memory areas between e.g. web browser processes. Management allows controlling the memory usage by prioritizing cache elements in caches of different type. Some embodiments of the mechanism may be web browser-specific. The mechanism may utilize the information about the states of browser processes at a given moment to make informed decisions about optimized shared memory behaviour.

The present invention describes a mechanism to achieve code sharing for dynamic languages. In Java environment, the just in time compilation (JIT) takes place on a method (or even code block) granularity. A just in time compilation may be implemented as a code generator that converts Java bytecode into native machine code. A hash value can be calculated from the full method signature and possibly from the code block offset. This hash value is used to uniquely identify a compiled native code object. This assumes that the method body is identical when running the method in different processes, which may not be true for dynamic languages like JavaScript. According to some example embodiments of the present invention the following mechanisms are suggested: JIT compilation for a method may be done in each process, when needed; a hash key may be calculated from the compiled native code object. It may also be checked whether this compilation result exists in cache which may mean that the compilation of this code has been done in some other process. If so, the cached result is taken into use and own compilation may be discarded thus saving memory. If not found, the compilation result is cached with the hash value as the key. This mechanism may save memory as the compilation results may be shared.

A JavaScript method is a series of statements that are interpreted to perform some repeated task. Instead of interpreting the statements each time the method is invoked, repeatedly invoked method can be dynamically compiled to native code and the native instructions cached for later use. This allows the quick version of the method to be used in subsequent invocations, but requires memory for storing the native instructions.

Sharing of data caches may be technically easier than sharing executable code, because the data is read-only. However, it should be noted that in some embodiments it may be possible to replace the read-only data with new data at any time.

According to a first aspect of the invention there is provided a method comprising:
  initiating a process for handling a set of information, which includes one or more resources;
  examining the set of information to determine whether the set of information includes a resource stored as a shareable cache element in a memory;
  if so, using the shareable cache element as said resource of the set of information.

In some embodiments the method comprises creating a cache element for the shareable cache element.

In some embodiments the method comprises including a cache element header for the shareable cache element.

In some embodiments the method comprises adding an identifier of the process into the cache element header to indicate that the process uses the shareable cache element as said resource.

In some embodiments the method comprises including at least one of the following fields in the cache element header:
  a key as an identifier of the cache element,
  a type of the cache element,
  a type-specific metadata,
  size of the cache element in the memory,
  update time of the cache element,
  use time of the cache element,
  active references indicative of the users of the cache element, and
  stored references indicative of previous users of the cache element.

In some embodiments the method comprises deactivating the process, and removing information of the process from the active references field.

In some embodiments the method comprises deactivating the process, and adding information of the process into the stored references field to indicate that the process have used the shareable cache element as said resource.

In some embodiments the method comprises examining, which cache elements are not used by any processes; and selecting one or more cache elements to be evicted from the cache elements which are not used by any processes.

In some embodiments the method comprises examining the amount of allocated memory with respect to non-allocated memory; and determining whether to select one or more cache elements to be evicted.

In some embodiments the selecting comprises examining type-specific metadata of the cache elements, examining type of the cache elements and/or examining the size of the cache elements.

In some embodiments the set of information is a web page.

In some embodiments the type of the cache element is one of the following:
  a parsed JavaScript code cache;
  a just-in-time-compiled JavaScript code cache;
  a hypertext transfer protocol file cache;
  a hypertext transfer protocol memory cache;
  a hypertext mark-up language application cache.
  a decoded image;
  a document object model tree;
  a page cache According to a second aspect of the invention there is provided an apparatus comprising at least one processor and at least one memory, said at least one memory stored with code thereon, which when executed by said at least one processor, causes an apparatus to:
  initiate a process for handling a set of information, which includes one or more resources;
  examine the set of information to determine whether the set of information includes a resource stored as a shareable cache element in a memory;
  if so, use the shareable cache element as said resource of the set of information.

In some embodiments the code, when executed by said at least one processor, causes the apparatus to create a cache element for the shareable cache element.

In some embodiments the code, when executed by said at least one processor, causes the apparatus to include a cache element header for the shareable cache element.

In some embodiments the code, when executed by said at least one processor, causes the apparatus to add an identifier of the process into the cache element header to indicate that the process uses the shareable cache element as said resource.

In some embodiments the code, when executed by said at least one processor, causes the apparatus to include at least one of the following fields in the cache element header:
  a key as an identifier of the cache element,
  a type of the cache element,
  a type-specific metadata,
  size of the cache element in the memory,
  update time of the cache element,
  use time of the cache element,
  active references indicative of the users of the cache element, and
  stored references indicative of previous users of the cache element.

In some embodiments the code, when executed by said at least one processor, causes the apparatus to deactivate the process, and remove information of the process from the active references field.

In some embodiments the code, when executed by said at least one processor, causes the apparatus to deactivate the process, and add information of the process into the stored references field to indicate that the process have used the shareable cache element as said resource.

In some embodiments the code, when executed by said at least one processor, causes the apparatus to examine, which cache elements are not used by any processes; and to select one or more cache elements to be evicted from the cache elements which are not used by any processes.

In some embodiments the code, when executed by said at least one processor, causes the apparatus to examine the amount of allocated memory with respect to non-allocated memory; and to determine whether to select one or more cache elements to be evicted.

In some embodiments the code, when executed by said at least one processor, causes the apparatus to examine type-specific metadata of the cache elements.

In some embodiments the code, when executed by said at least one processor, causes the apparatus to examine type of the cache elements.

In some embodiments the code, when executed by said at least one processor, causes the apparatus to examine the size of the cache elements.

In some embodiments the set of information is a web page.

In some embodiments the type of the cache element is one of the following:
  a parsed JavaScript code cache;
  a just-in-time-compiled JavaScript code cache;
  a hypertext transfer protocol file cache;
  a hypertext transfer protocol memory cache;
  a hypertext mark-up language application cache.
  a decoded image;
  a document object model tree;
  a page cache According to a third aspect of the invention there is provided an apparatus comprising:

an initiator adapted to initiate a process for handling a set of information, which includes one or more resources;

a cache manager adapted to examine the set of information to determine whether the set of information includes a resource stored as a shareable cache element in a memory;

a processing block adapted to use the shareable cache element as said resource of the set of information, if the set of information includes a resource stored as a shareable cache element in the memory.

According to a fourth aspect of the invention there is provided an apparatus comprising:

means for initiating a process for handling a set of information, which includes one or more resources;

means for examining the set of information to determine whether the set of information includes a resource stored as a shareable cache element in a memory;

means for using the shareable cache element as said resource of the set of information, if the set of information includes a resource stored as a shareable cache element in the memory.

In some embodiments the apparatus further comprises means for creating a cache element for the shareable cache element.

In some embodiments the apparatus further comprises means for including a cache element header for the shareable cache element.

In some embodiments the apparatus further comprises means for adding an identifier of the process into the cache element header to indicate that the process uses the shareable cache element as said resource.

In some embodiments the apparatus further comprises means for including at least one of the following fields in the cache element header:

a key as an identifier of the cache element,
a type of the cache element,
a type-specific metadata,
size of the cache element in the memory,
update time of the cache element,
use time of the cache element,
active references indicative of the users of the cache element, and
stored references indicative of previous users of the cache element.

In some embodiments the apparatus further comprises means for deactivating the process, and removing information of the process from the active references field.

In some embodiments the apparatus further comprises means for deactivating the process, and adding information of the process into the stored references field to indicate that the process have used the shareable cache element as said resource.

In some embodiments the apparatus further comprises means for:

examining, which cache elements are not used by any processes; and selecting one or more cache elements to be evicted from the cache elements which are not used by any processes.

In some embodiments the apparatus further comprises means for:

examining the amount of allocated memory with respect to non-allocated memory; and determining whether to select one or more cache elements to be evicted.

In some embodiments the apparatus further comprises means for examining type-specific metadata of the cache elements.

In some embodiments the apparatus further comprises means for examining type of the cache elements.

In some embodiments the apparatus further comprises means for examining the size of the cache elements.

According to a fifth aspect of the invention there is provided a computer readable storage medium stored with code thereon for use by an apparatus, which when executed by a processor, causes the apparatus to:

initiate a process for handling a set of information, which includes one or more resources;

examine the set of information to determine whether the set of information includes a resource stored as a shareable cache element in a memory;

if so, use the shareable cache element as said resource of the set of information.

DESCRIPTION OF THE DRAWINGS

In the following the present invention will be disclosed in more detail with reference to the accompanying drawings, which are not necessarily drawn to scale, and wherein.

DETAILED DESCRIPTION OF SOME EXAMPLE EMBODIMENTS

Figure 1:
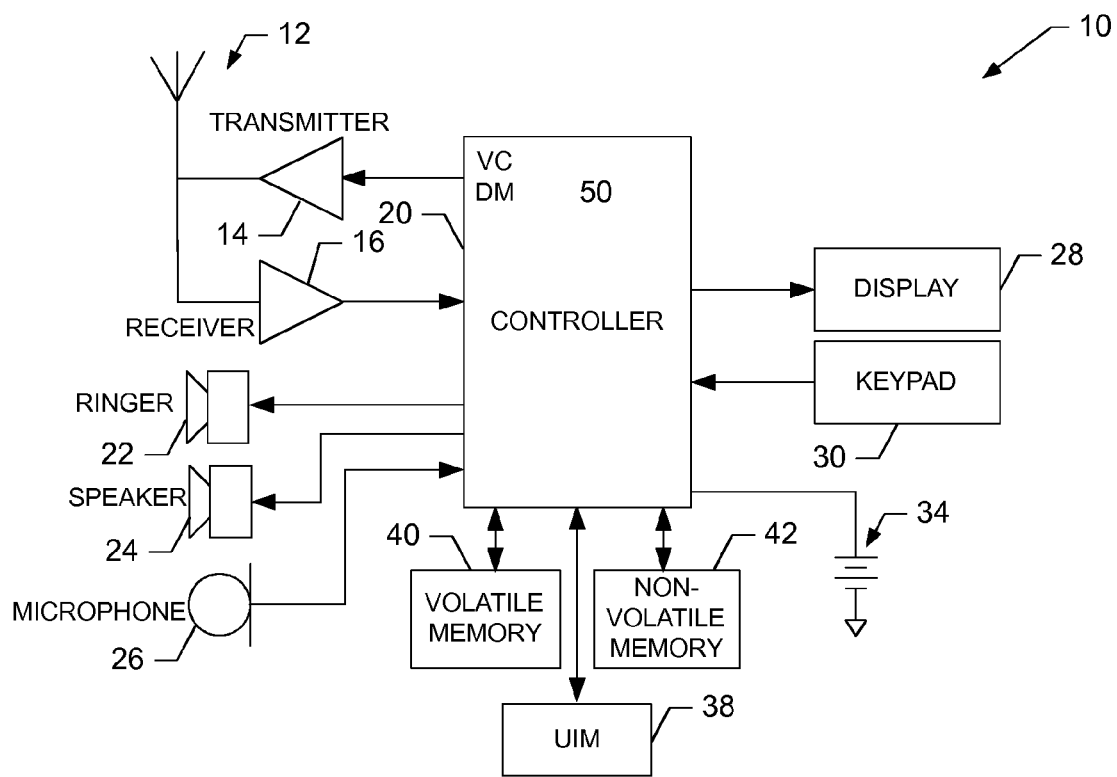
FIG. 1 is a schematic block diagram of a mobile terminal that may employ an example embodiment.

Some embodiments will now be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments. Furthermore, the terms "browser", "application", "program" and similar terms may be used interchangeably to refer to a process capable of being executed by a processor, a microprocessor, a computer or a similar apparatus in accordance with embodiments. Thus, use of any such terms should not be taken to limit the spirit and scope of various embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

FIG. 1, one example embodiment, illustrates a block diagram of a mobile terminal 10 that would benefit from various embodiments. It should be understood, however, that the mobile terminal 10 as illustrated and hereinafter described is merely illustrative of one type of device that may benefit from various embodiments and, therefore, should not be taken to limit the scope of embodiments. As such, numerous types of mobile terminals, such as portable digital assistants (PDAs), mobile telephones, pagers, mobile televisions, gaming devices, laptop computers, cameras, video recorders, audio/video players, radios, positioning devices (for example, global positioning system (GPS) devices), embedded systems or any combination of the aforementioned, and other types of voice and text communications systems, may readily employ various embodiments.

The mobile terminal 10 may include an antenna 12 (or multiple antennas) in operable communication with a transmitter 14 and a receiver 16. The mobile terminal 10 may further include an apparatus, such as a controller 20 or other processing device, which provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 is capable of operating a connectivity program, such as a Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 may further include a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), and the like. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10.

Figure 2:
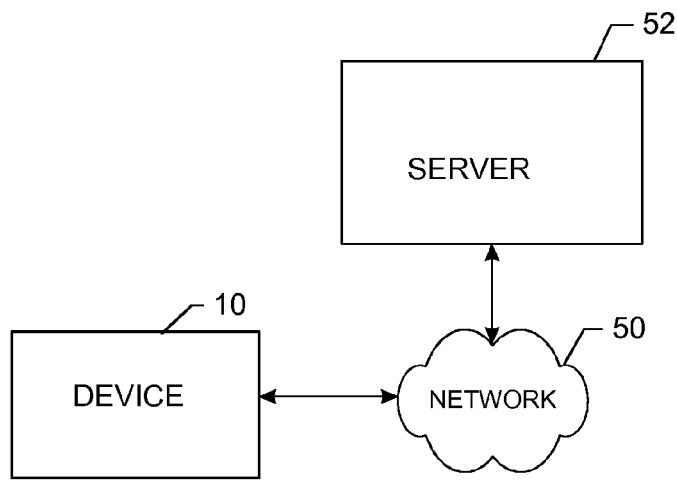
FIG. 2 is a schematic block diagram of a wireless communications system according to an example embodiment.

FIG. 2 is a schematic block diagram of a wireless communications system according to an example embodiment. Referring now to FIG. 2, an illustration of one type of system that would benefit from various embodiments is provided. As shown in FIG. 2, a system in accordance with an example embodiment includes a communication device (for example, mobile terminal 10) and in some cases also additional communication devices that may each be capable of communication with a network 50. The communications devices of the system may be able to communicate with network devices or with each other via the network 50. There may also be a server 52 or servers capable of communicating with the network and containing web pages to be downloaded to the communication device(s) 10.

In an example embodiment, the network 50 includes a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 50. Although not necessary, in some embodiments, the network 50 may be capable of supporting communication in accordance with any one or more of a number of first generation (1G), second generation (2G), 2.5G, third generation (3G), 3.5G, 3.9G, fourth generation (4G) mobile communication protocols, Long Term Evolution (LTE), and/or the like.

One or more communication terminals such as the mobile terminal 10 and the other communication devices may be capable of communication with each other and/or with the servers 52 via the network 50 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (for example, personal computers, server computers or the like) may be coupled to the mobile terminal 10 via the network 50. By directly or indirectly connecting the mobile terminal 10 and other devices to the network 50, the mobile terminal 10 and the other devices may be enabled to communicate with each other and/or the network, for example, according to numerous communication protocols including Hypertext Transfer Protocol (HTTP) and/or the like, to thereby carry out various communication or other functions of the mobile terminal 10 and the other communication devices, respectively.

Furthermore, although not shown in FIG. 2, the mobile terminal 10 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 may be enabled to communicate with the network 50 and other communication devices by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

Figure 3:
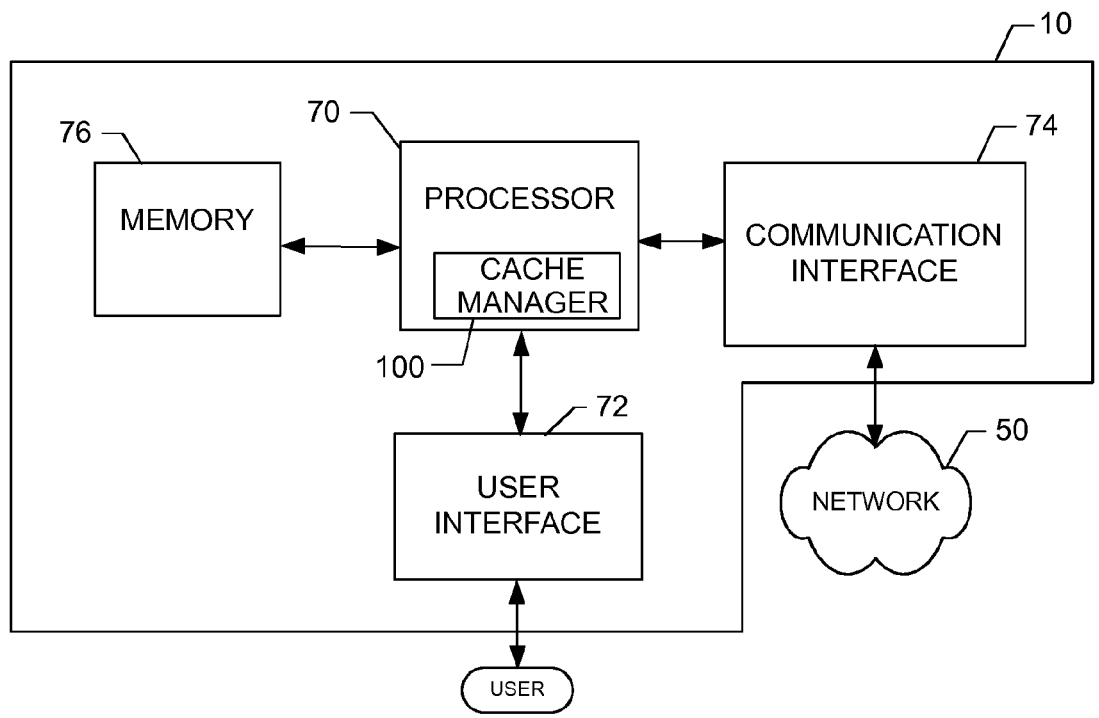
FIG. 3 illustrates a block diagram of an apparatus for providing a mechanism to share and manage memory areas between different processes according to an example embodiment.

FIG. 3 illustrates a block diagram of an apparatus that may be employed at the mobile terminal 10 to host or otherwise facilitate the operation of an example embodiment. An example embodiment will now be described with reference to FIG. 3, in which certain elements of an apparatus for providing shared cache allocation are displayed. The apparatus of FIG. 3 may be employed, for example, on the mobile terminal 10. However, the apparatus may alternatively be embodied at a variety of other devices, both mobile and fixed (such as, for example, any of the devices listed above). Furthermore, it should be noted that the devices or elements described below may not be mandatory and thus some may be omitted in certain embodiments.

The apparatus may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (for example, a computer readable storage medium) comprising gates configured to store data (for example, bits) that may be retrievable by a machine (for example, a computing device). The memory device 76 may be configured to store information, data, applications, instructions or the like for enabling the apparatus to carry out various functions in accordance with example embodiments. For example, the memory device 76 could be configured to buffer input data for processing by the processor 70. Additionally or alternatively, the memory device 76 could be configured to store instructions for execution by the processor 70. The apparatus may also include a cache manager 100 that may manage the memory usage of the apparatus. The cache manager 100 may be implemented as a program code of the processor 70 or it may be a separate processor, a controller or other applicable element.

The processor 70 may be embodied in a number of different ways. For example, the processor 70 may be embodied as one or more of various processing means such as a microprocessor, a controller, a digital signal processor (DSP), a processing device with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (for example, physically embodied in circuitry) capable of performing operations according to embodiments while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (for example, the mobile terminal 10 or other communication device) adapted for employing various embodiments by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus is embodied as a server or some other network devices, the user interface 72 may be limited, or eliminated. However, in an embodiment in which the apparatus is embodied as a communication device (for example, the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (for example, memory device 76, and/or the like).

In the following some example technical implementations of the present invention are described based on a web page rendering engine called WebKit. However, the invention is not limited to such browsers but it can also be implemented on other web browsers as well.

Figure 7A:
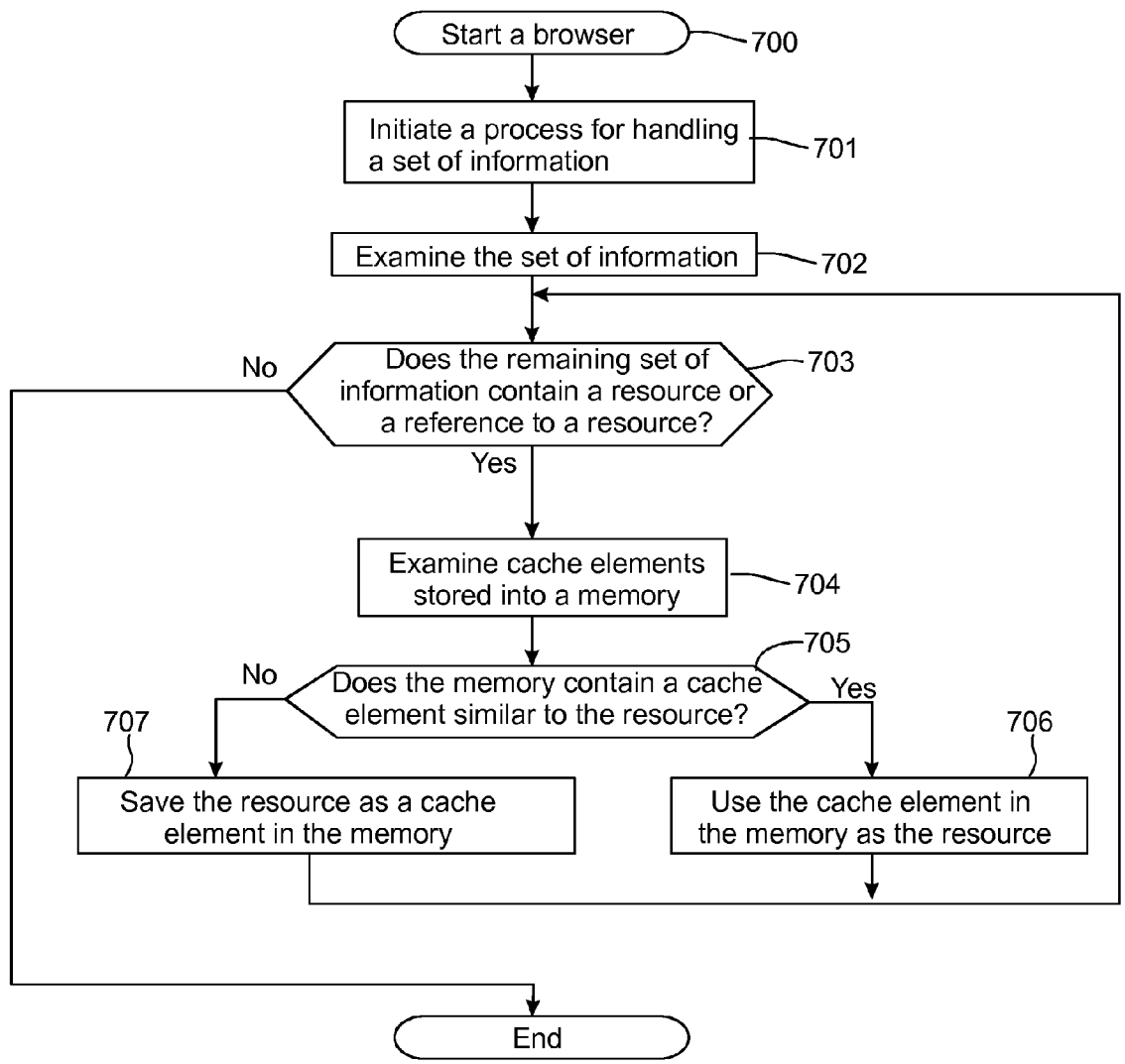
FIGS. 7a and 7b depict as a flow diagram a method according to an example embodiment.

When the user starts to browse web pages, the user may use the user interface 72 of the device 10 to instruct the operating system to start the web browser 80 (block 700 in FIG. 7*a*). The web browser 80 initiates (block 701) and provides information to the operating system to display a browser window, for example. The operating system also reserves some memory for the web browser so that the web browser may store data and code into the memory. The user can then enter an address of a web page or select from previously stored bookmarks one which the user wishes to view. In this context the term bookmark means information of an address of a web page which has been stored into the memory of the device so that that web page can be easily accessed without typing the whole address of the web page. Bookmarks may have been stored as a parameter in a data file accessible by the web browser. The address may be e.g. in a form of a uniform resource locator (URL).

When the address of the desired web page has been entered to the web browser, the web browser uses the address to obtain the addressed web page. The web page may not be stored in the memory of the device wherein the web browser may need to communicate with the network 50 accordingly. The communication may need co-operation between the web browser and the operating system, or the web browser may have direct access to the low level software (e.g. device drives) which control the communication interface 74 of the device.

If the searched web page exists somewhere in the network 50, for example in the server 52, the web page may be communicated from the network 50 to the device 10 so that the web browser 80 can execute the code of the web page to show the contents of it. Usually, web pages are constructed using the so called Hyper Text Mark-Up Language (HTML). Actually, information to reconstruct a web page by a user's device may have been stored into one or more files. Hence, the web browser downloads the files from the network 50 and reads the contents of the files, interprets the commands stored in the files, and builds up the web page on the display of the device, accordingly.

Figure 4:
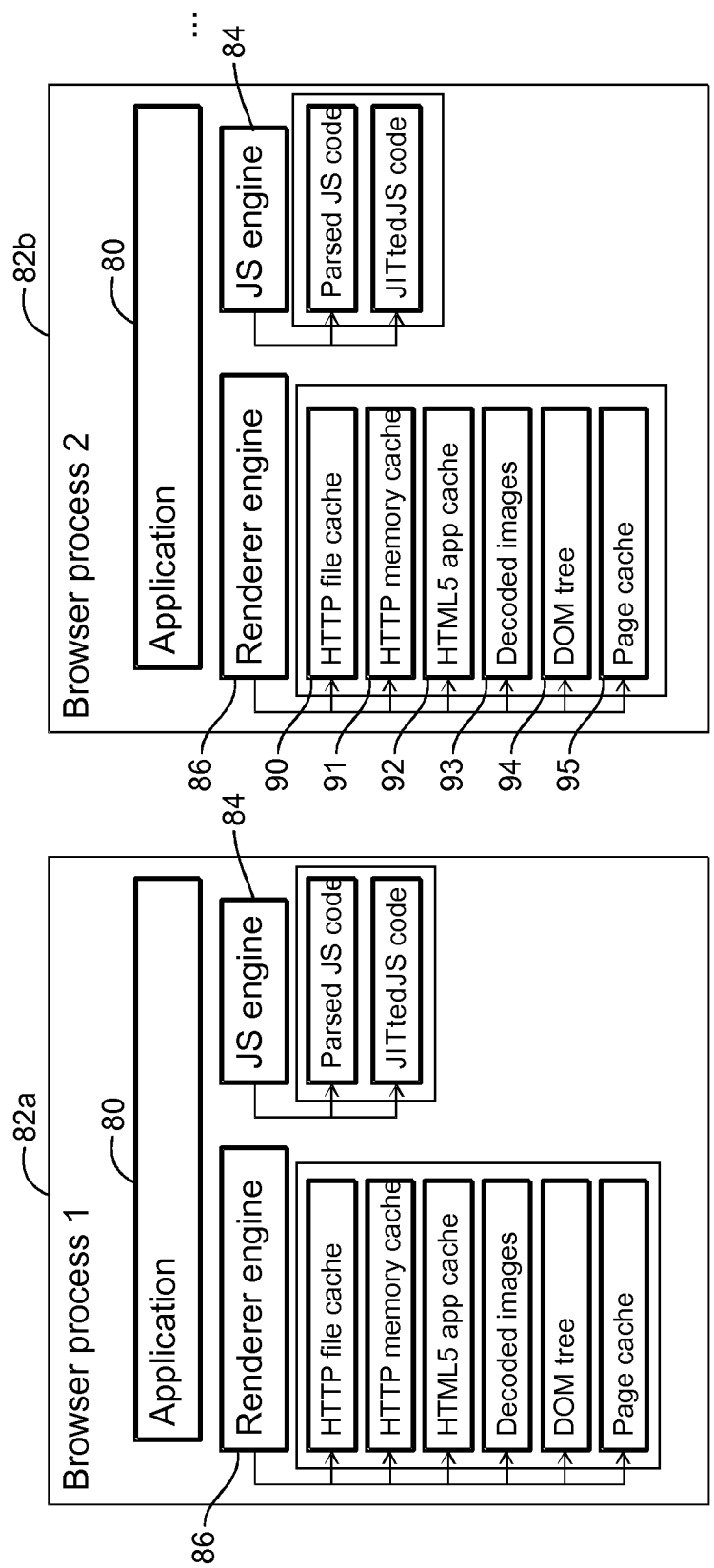
FIG. 4 illustrates a conceptual block diagram of executing each browser application as a separate process.

The web browser may be able to handle more than one web page at a time in different windows or tabs. In other words, the web browser may have a multiple of open sites (web pages) at a time. The web browser may run each tab in its own operating system process or it may run all tabs in a single operating system process. In the following it is assumed that the web browser runs each tab in its own process. This is also illustrated in FIG. 4 in which the block 82*a* illustrates a first browser process and the block 82*b* illustrates a second browser process. There may also be more than two browser processes active at the same time.

Now, some details on how some embodiments of the present invention work when a web page is build up will be explained.

Internally, a web browser, such as WebKit, may have two main components: a JavaScript engine 84 and a rendering engine 86. Both of these components may have distinct memory usage patterns. The JavaScript engine 84 is a specialized computer software which interprets and executes JavaScript, for example. The rendering engine 86 is a software component that takes marked up content (such as HTML, extensible mark-up language (XML), image files, etc.) and formatting information (such as cascading style sheets (CSS), extensible stylesheet language (XSL), etc.) and displays the formatted content on a display of a device. The JavaScript engine 84 may allocate memory for storage for parsed JavaScript code 96, and memory for storage for just in time (JIT)—compiled JavaScript code 97. The JavaScript engine 84 may allocate memory for a heap 98 and a stack 99 for executing JavaScript code. Out of these, storage areas for parsed and just in time compiled JavaScript code may be good candidates for sharing memory. The heap and the stack may be so dynamic that sharing those may not be practical. However, sharing of the heap and/or the stack are not excluded from the scope of the present invention. Sharing of dynamically generated executable code may have some prerequisites, such as making the code relocatable and ensuring that the code is not written to while executing it. Sharing of the executable code is expected to be achieved also for more dynamic languages, such as JavaScript.

The rendering engine 86 loads web resources and shows web pages to the user. The rendering engine 86 may allocate memory for a HTTP file cache 90 for web resources, a HTTP memory cache 91 for web resources, an HTML5 application cache 92, memory 93 for decoded images, and memory 94 for a document object model (DOM) tree. The document object model is an application programming interface (API) for valid HTML and well-formed XML documents. It defines the logical structure of documents and the way a document is accessed and manipulated.

In addition, many web browsers have a so called page cache 95, which is effectively a memory cache for visited pages i.e. web pages shown by the web browser. The page cache allows fast back-forward navigation by "pausing" a page and storing as much as possible of the contents of the page to be able to show the page quickly, if the user browses back to the same page. Usually, the page cache may store all resources related to the main HTML page whereas HTTP caches may store each resource individually. HTTP caches can be utilized by two or more distinct pages if they have common resources that are found from the HTTP cache. In addition, using page cache is not necessarily possible for all pages, because it may be impossible to reliably determine the state of a page. If a page cache is shared between processes, the state of the page is also shared, which means that some security enforcements may need to be taken into consideration. For example, it can be verified that only processes with the same permissions are able to share a page cache.

Figure 5:
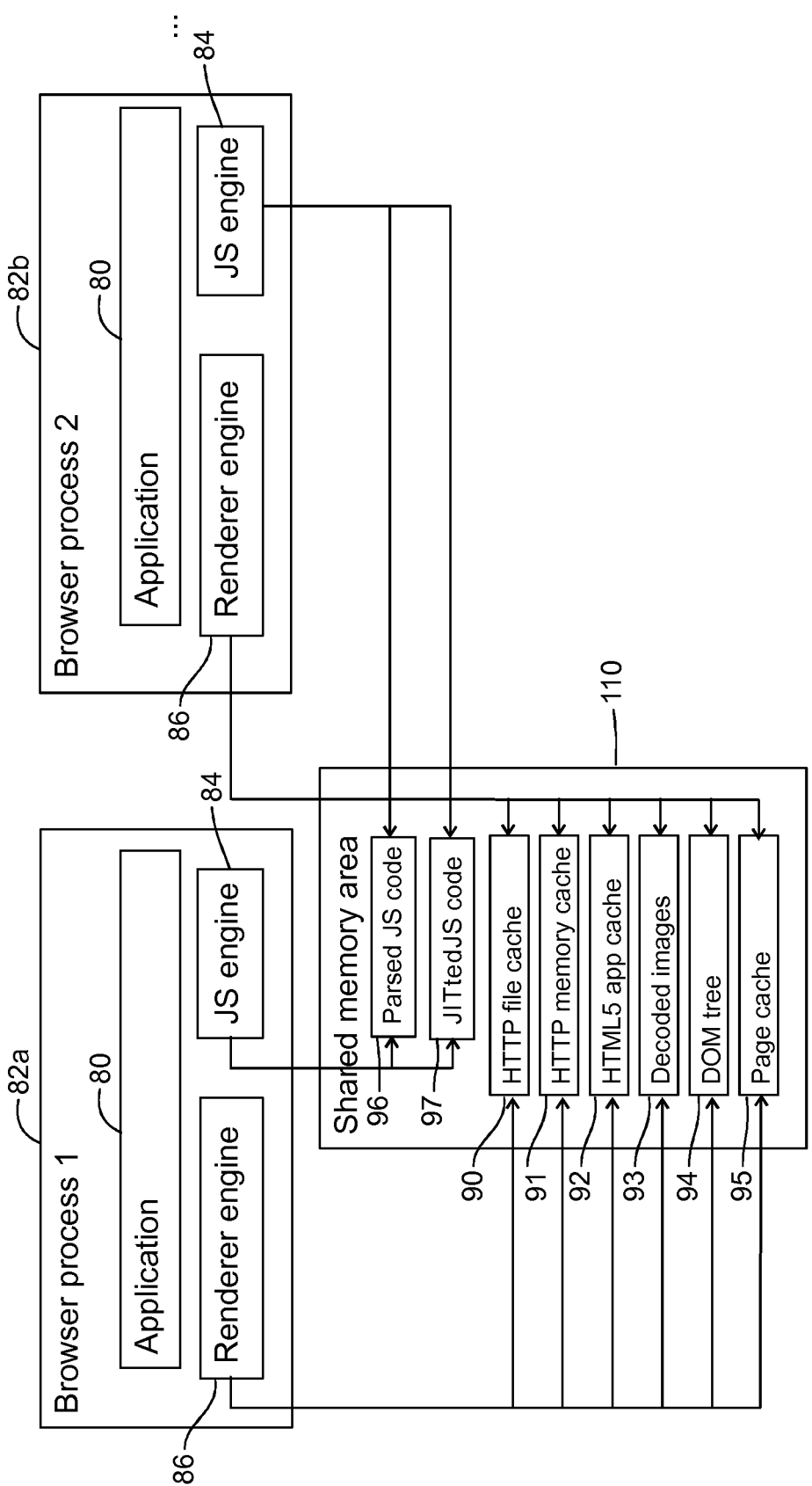
FIG. 5 illustrates a conceptual block diagram of memory sharing according to an example embodiment.

Some embodiments of the present invention allow sharing of resources in various caches between processes using a shared memory 110. This principle is depicted in FIG. 5. The invention can be implemented e.g. by a cache manager 100 (FIG. 6) that may manage the total memory usage of the system by centralizing the cache management decisions for all or for some of the cache types. The cache manager 100 manages both volatile and non-volatile memory usage by storing and removing cached resources to and from shared memory areas 110. Some examples of various cache types and their features are listed in Table 1.

TABLE 1

Features of various cache types.

| Cache type | Cache storage memory type | Commonly-used eviction policy | Resource origin |
|---|---|---|---|
| Parsed JavaScript code cache | volatile | Reference-counting LRU, cache size | Browser generated |
| JIT-compiled JavaScript code cache | volatile | Reference-counting LRU, cache size | Browser generated |
| HTTP file cache | non-volatile | HTTP cache control headers, LRU, cache size | Loaded from network |
| HTTP memory cache | volatile | HTTP cache control headers, LRU, cache size | Loaded from network |
| HTML5 application cache | non-volatile | Eviction only by user action | Loaded from network |
| Decoded images | volatile | Reference-counting LRU, cache size | Browser generated |
| DOM tree | volatile | Reference-counting LRU, cache size | Browser generated |
| Page cache | volatile | Reference-counting LRU, cache size | Loaded from network |

Commonly-used eviction policy is the policy that is currently implemented inside browsers. When implementing the invention, these eviction policies may be modified to suit centralized cache management with the shared memory.

The resource origin describes whether resources of a certain cache type are loaded from the network or generated by the browser. Resources generated by the browser are typically derived from the resources loaded from the network. It may be guaranteed that a browser-generated resource is the same, if derived from the same network resource.

Figure 6:
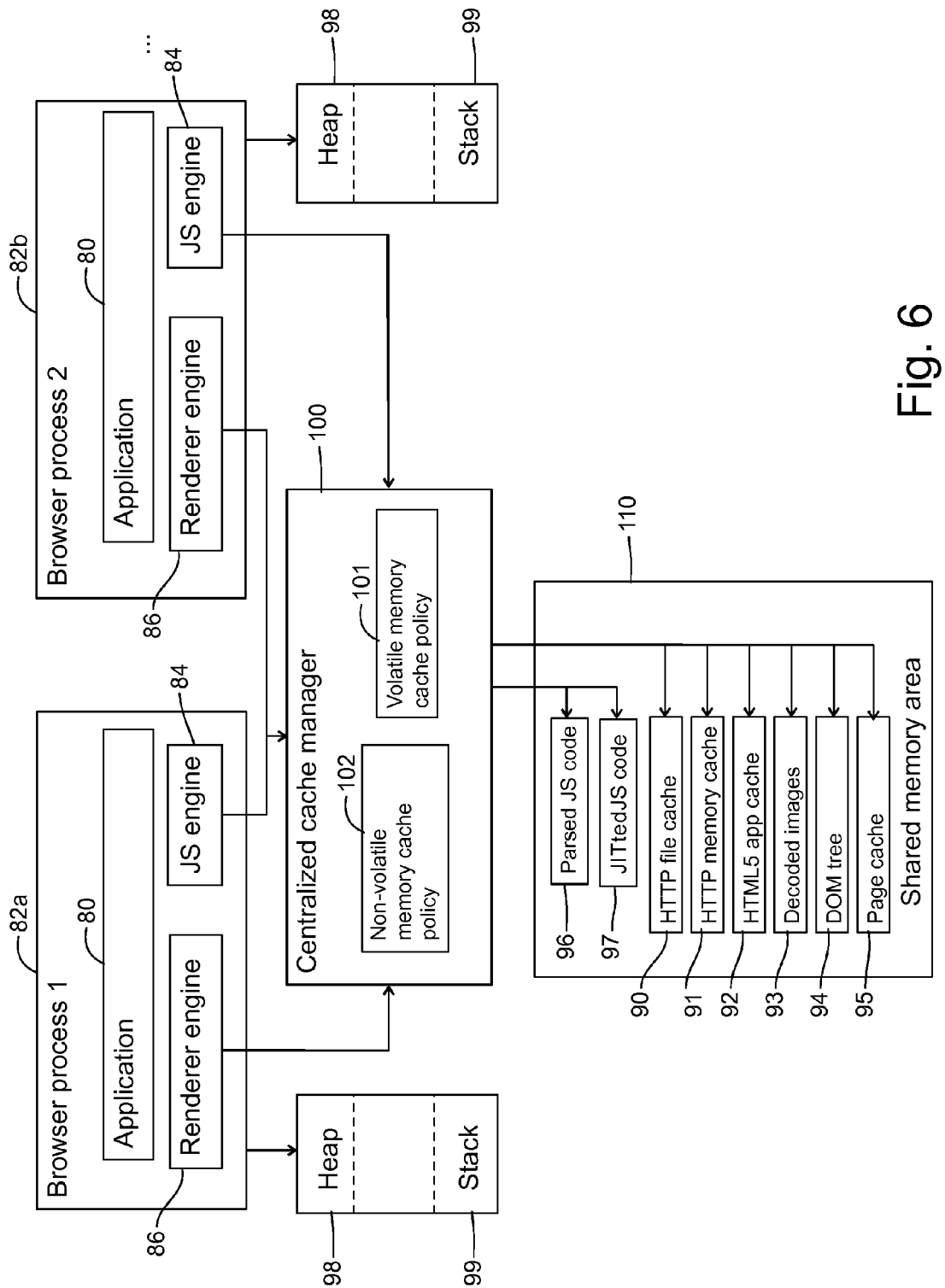
FIG. 6 illustrates a conceptual block diagram of memory sharing using a cache manager according to an example embodiment.

The cache manager operation is shown in FIG. 6. In an example implementation separate cache policies exist for volatile (e.g. RAM) and non-volatile (e.g. disk/flash) memories. The cache policy for volatile memory is illustrated with a reference numeral 101 and the cache policy for non-volatile memory is illustrated with a reference numeral 102 in FIG. 6. In some example embodiments the maximum amount of used memory can be set for both.

The elements in the shared cache may have the fields shown in Table 2.

TABLE 2

Cache element fields.

| Cache element field | Meaning |
|---|---|
| Key | Cache element is identified using the key. The key may be the URI from where the cache element was loaded from, which may be different from the URI of the main page. The key may also include a hash value calculated from the last modified date or actual data of the cache element. |
| Type | The type of cache element (e.g. HTTP cache element, HTML5 app cache element, page cache element, etc.) |
| Type-specific metadata | Possible cache type specific information that affects caching decisions. E.g. HTTP cache control headers for HTTP cache element. |
| Size | The amount of memory that the cache element consumes when stored. |
| Update time | When the cache element was created/last updated. |
| Use time | When the cache element was last used. |
| Active references | List of process ids of the processes that are currently using the cache element. |
| Stored references | List of process ids of the processes that have previously used the cache element and may benefit from keeping the cache element in the cache. |
| Data | Actual data of the cache element. |

The cache element fields Key, Type, Type-specific metadata, Size, Update time, Use time, Active references and Stored references may also be called as a cache element header to distinguish these fields from the actual data of the cache element.

The cache manager 100 may operate based on the following rules. An active cache element means that a process is currently using the cache element (i.e. the element has at least one active reference). A stored cache element means that the cache element is stored in the cache, but no process is currently using it. Only stored cache elements can be evicted but active ones cannot. If a cache element has type-specific metadata, rules in this meta-data may be taken into consideration and may override common rules. For example, rules may prevent eviction. When a cache element is evicted, the memory that stored the cache element can be freed. When a cache element has been evicted and a process requires this cache element, the process needs to reload, redecode and/or reparse the resource and add a new cache element.

The cache manager eviction logic may depend on the total memory situation of the system. For example, the cache manager 100 may examine the amount of allocated memory with respect to non-allocated memory to determine whether there is a low-memory situation or a normal memory situation. There may be one or more thresholds which the cache manager 100 may compare with the ratio of the amount of allocated memory to the amount of non-allocated memory to determine the memory situation. In an example implementation the eviction logic for volatile caches may be as follows. Cache elements that can be freed are identified based on type-specific metadata and active references. In a low-memory situation cache elements may be evicted based on priority. The priorities may depend on, for example, the size, the number of stored references, the use time, the update time of the cached element. In normal memory situation cache elements may be evicted based on a different priority such as the number of stored references, the use time, the update time, the size.

Following the above eviction logic may result most cache elements to be handled in a coherent way regardless of their type. This may allow more efficient system-level cache management than silo-based approach. It is also possible to e.g. evict all cache elements of a specific type, if the cache elements of that type are seen less important. For example, it may be better to evict decoded images and DOM parsing results if the device is in offline mode since it may be possible to recreate those without a network connection.

The eviction policy may also depend on the context in which the device is operating. One possible context mentioned above is the offline/online modes of the device. Another context may depend on if the device is attached with or connected to another device or apparatus, if a memory card has been installed to the device, etc.

When a web browser 80 downloads a web page and the renderer engine 86 renders the page on the display, the renderer engine 86 informs the cache manager 100 the need to allocate memory for the web page, e.g. for the HTTP file cache 90, the HTTP memory cache 91, the HTML5 application cache 92, the page cache 95, memory 93 for decoded images, and memory 94 for the document object model (DOM) tree. In a page cache situation the cache manager 100 may calculate a hash value or another id value for each cache area and examine the shared memory 110 to determine whether the similar cache area already exists which can be shared with the new web process or whether a new cache area needs to be created. The cache manager 100 may also examine whether the web page refers to an object which has already been stored in a cache area (blocks 702-705). A cache area may include several cache elements which may be shareable. The shareable cache elements may be methods inside a HTML code, pictures, and other resources. Some of these cache elements may be identified by their load addresses. The load address may be a URL, URI or another kind of a link to the object which has been loaded from the indicated address and stored to the cache area. For example, different web pages may have a link to the same object, such as a HTTP file, a picture, etc. Hence, the link on both web pages can be the same wherein the cache manager 100 may compare the load addresses to determine whether for each cache area and examine the shared memory 110 to determine whether similar cache area already exists which can be shared with the new web process (block 706) or whether a new cache area needs to be created (block 707). As an example a cache element can be a single picture at the address http://www.example.com/example.gif that can be referenced by many pages, e.g. web pages at addresses http://www.example.com/page1.html and http://www.example.com/page2.html. It should be noted here that the above mentioned addresses are just non-limiting examples and may not represent real web pages or pictures.

The determination may be based on, for example, a comparison between the calculated id value and the value of the key element field of an existing cache area or between the address of the object and the load addresses in the cache area. If a shareable cache area exists the cache element fields of the shareable cache area are updated accordingly. For example, the active references field is added with indication of the new process (process id). Also the use time may be updated. If no shareable cache area exists a new cache area is created and the cache element fields, for example the fields described in Table 2, are filled on the basis of the new cache area.

Correspondingly, the JavaScript engine 86 interprets the instructions of the downloaded page and informs the cache manager 100 the need to allocate memory for the interpreted code of the web page, e.g. memory for parsed JavaScript code 96, just in time compiled JavaScript code 97, heap 98 and stack 99. The cache manager 100 may calculate a hash value or another id value for each interpreted code element and examine the shared memory 110 to determine whether the similar interpreted code element already exists which can be shared with the new web process or whether a new interpreted code element needs to be created. If a shareable interpreted code element exists the element fields of the interpreted code element are updated accordingly. For example, the active references field is added with indication of the new process (process id). Also the use time may be updated. If no shareable interpreted code element exists a new interpreted code element is created and the element fields, for example the fields described in Table 2, are filled on the basis of the new interpreted code element.

Figure 7B:
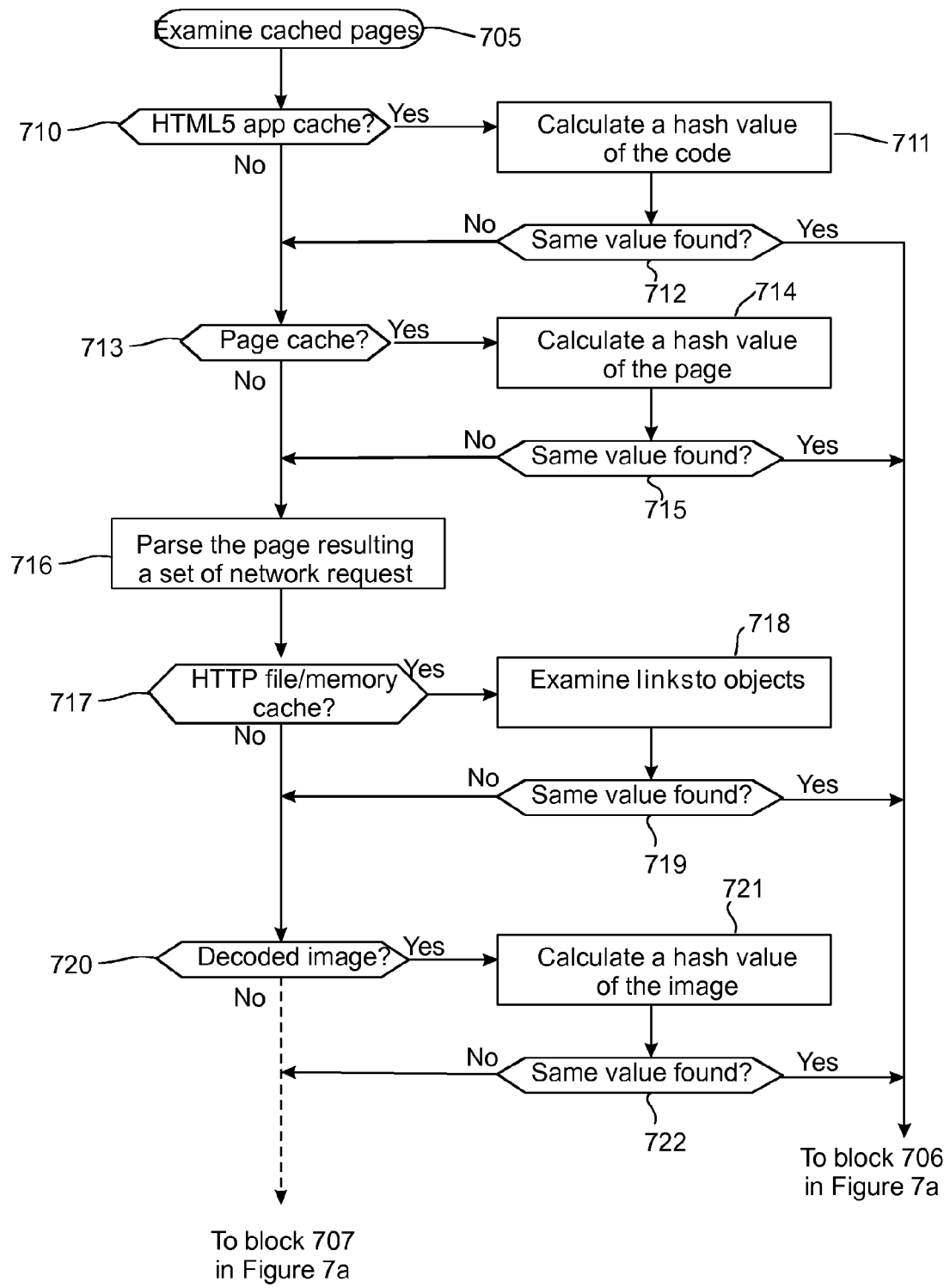

FIG. 7b illustrates some examples of the operation of the cache manager 100 when it searches the cache area(s) to find shareable cache elements. For example, in block 710 the cache manager 100 examines whether the HTML5 app cache is to be performed. If so, the cache manager 100 calculates in block 711 e.g. a hash value of the code and in block 712 compares the calculated hash value with hash values of headers of stored cache elements. If the same hash value has been found the operation may continue to block 706 of FIG. 7a. If the same hash value was not found the operation may continue to block 713. In block 713 it is checked whether the page cache is to be performed. If so, the cache manager 100 calculates in block 714 e.g. a hash value of the page and in block 715 compares the calculated hash value with hash values of headers of stored cache elements. If the same hash value has been found the operation may continue to block 706 of FIG. 7a. If the same hash value was not found the operation may continue to block 716. In block 713 the page is parsed by the browser resulting a set of network requests for each resource on the page. The availability of each of these resources may be checked from the HTTP file/memory cache and decoded images cache. In block 717 the cache manager 100 examines if a HTTP cache is to be performed. If so, the cache manager 100 examines in block 718 links to objects and compares possibly found links with the link in the web page under examination. If the same link has been found the operation may continue to block 706 of FIG. 7a. If the same link was not found the operation may continue to block 720. In block 720 the cache manager 100 examines if a decoded page is to be stored. If so, the cache manager 100 calculates in block 721 e.g. a hash value of the page and in block 722 compares the calculated hash value with hash values of headers of stored cache elements. If the same hash value has been found the operation may continue to block 706 of FIG. 7a. If the same hash value was not found the operation may continue to yet another check or to the block 707 of FIG. 7a.

There are optional approaches to save the resource (block 707), depending on the type. For individual cache elements that are stored to HTTP file/memory cache, storing may be done after the network request is completed and the file have been received. For cache elements that are generated by the browser, storing may be done after the browser has finished generating the resource which may happen sometime after the resource has been loaded. For HTML5 app cache, storing may be done after the dedicated cache update process, for example when a page is loaded. For the page cache, the storing may be done when the user navigates away from a page.

Figure 8:
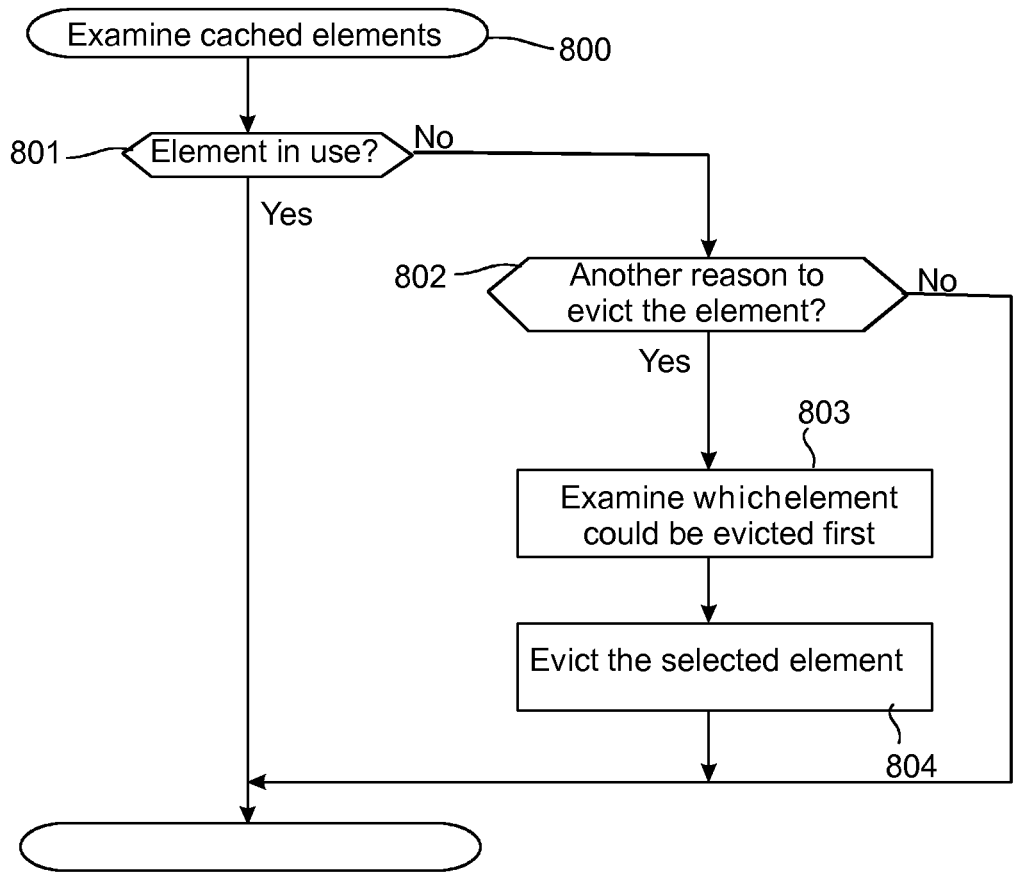
FIG. 8 illustrates an example of an eviction process.

FIG. 8 illustrates an example of an eviction process 800 which may be performed by the cache manager 100 when a need to evict a cache element arises or a web process terminates, or by some other reason.

When the browser process terminates the cache manager 100 examines which elements were used by the terminated browser process. The cache manager 100 examines the element fields of such elements to determine whether such element can be evicted or not. For example, the cache manager 100 may examine identification information stored in the active references field to determine if that field contains also other ids than the id of the terminated process (block 801). If so, the element may not be evicted unless there is an overriding rule which makes the cache manager 100 to evict the element (block 802). This situation may occur, for example, when the memory of the device is almost totally allocated and some parts of the memory is needed by another process. In this kind of situation the cache manager 100 may examine e.g. the use time, the type, the size or other information of the element fields to determine (block 803) which element (cache area, code element, etc.) could be evicted (block 804) and the memory in which the element was stored could be freed to other processes.

If the examination of the active references field reveals that this element was only used by the terminated process, the cache manager 100 may decide to evict the element and also delete the element fields of the element (block 804).

It should be noted here that the eviction operation need not mean that the evicted area of the memory is changed or modified but it may be sufficient to provide an indication that this memory area is free so that other processes may use it when needed. For example, the cache manager 100, a memory manager (not shown), the processor or some other unit may be able to use a parameter array in which information of allocation situation of blocks of the memory are indicated. The memory may have been divided into blocks of a certain size wherein the allocation situation of each block may be indicated by one bit, for example. The block size may be, for example, 64 bytes, 256 bytes, 512 bytes, 1024 bytes or some size. The size is usually a power of two.

In some implementations the device 10 may store the contents of volatile caches when the device is shut down. Hence, the stored data can be read back to the volatile memory when the device 10 is switched on again.

The above described resource-level sharing may have the advantage that a cached resource can be shared between processes even though processes are showing unrelated pages that happen to load some common resource.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
   initiating a process for handling a set of information, which includes one or more resources; examining, with a processor, the set of information to determine whether the set of information includes a resource stored as a shareable cache element in a memory; and
   in an instance in which the set of information includes a resource stored as a shareable cache element in a memory, using the shareable cache element as said resource of the set of information;
   the method further comprising creating and storing in the memory a cache element header for the shareable cache element, the cache element header comprised of a plurality of fields, where a first field of the plurality of fields is an active references field comprised of a list of process identifiers of those processes that are currently using the sharable cache element, and where a second field of the plurality of fields is a stored references field comprised of a list of process identifiers of those processes that have previously used the sharable cache element.

2. The method according to claim 1, where the stored references field identifies one or more processes that could benefit from retaining the sharable cache element in the memory, and where the stored references field is consulted during a cache entry eviction procedure.

3. The method according to claim 1, further comprising including at least one of the following fields in the cache element header:
   a key as an identifier of the cache element,
   a type of the cache element,
   a type-specific metadata,
   size of the cache element in the memory,
   update time of the cache element, and
   use time of the cache element.

4. The method according to claim 3, wherein the cache element header comprises said key, said key comprising at least one of the following: a uniform resource indicator; a hash value calculated by using at least part of the contents of the cache element.

5. The method according to claim 1, further comprising deactivating the process, and removing information of the process from the active references field.

6. The method according to claim 1, further comprising deactivating the process, and adding information of the process into the stored references field to indicate that the process has used the shareable cache element as said resource.

7. The method according to claim 1, further comprising examining, which cache elements are not used by any processes; and selecting one or more cache elements to be evicted from the cache elements which are not used by any processes.

8. The method according to claim 1, further comprising examining, which cache elements are least used by the processes; and selecting one or more cache elements to be evicted from the cache elements which are least used.

9. The method according to claim 1 comprising examining an amount of allocated memory with respect to non-allocated memory; and determining whether to select one or more cache elements to be evicted.

10. An apparatus comprising at least one processor and at least one memory, said at least one memory stored with code thereon, which when executed by said at least one processor, causes the apparatus to:
    initiate a process for handling a set of information, which includes one or more resources; examine the set of information to determine whether the set of information includes a resource stored as a shareable cache element in a memory; and
    in an instance in which the set of information includes a resource stored as a shareable cache element in a memory, use the shareable cache element as said resource of the set of information;

said at least one memory stored with code thereon, which when executed by said at least one processor, further causes the apparatus to create and store in the memory a cache element header for the shareable cache element, the cache element header comprised of a plurality of fields, where a first field of the plurality of fields is an active references field comprised of a list of process identifiers of those processes that are currently using the sharable cache element, and where a second field of the plurality of fields is a stored references field comprised of a list of process identifiers of those processes that have previously used the sharable cache element.

11. The apparatus according to claim 10, where the stored references field identifies one or more processes that could benefit from retaining the sharable cache element in the memory, and where the stored references field is consulted during a cache entry eviction procedure.

12. The apparatus according to claim 10, said at least one memory stored with code thereon, which when executed by said at least one processor, further causes the apparatus to include at least one of the following fields in the cache element header:
a key as an identifier of the cache element,
a type of the cache element,
a type-specific metadata,
size of the cache element in the memory,
update time of the cache element, and
use time of the cache element.

13. The apparatus according to claim 10, said at least one memory stored with code thereon, which when executed by said at least one processor, further causes the apparatus to deactivate the process, and add information of the process into the stored references field to indicate that the process has used the shareable cache element as said resource.

14. The apparatus according to claim 10, said at least one memory stored with code thereon, which when executed by said at least one processor, further causes the apparatus to: examine, which cache elements are not used by any processes; and select one or more cache elements to be evicted from the cache elements which are not used by any processes.

15. The apparatus according to claim 10, said at least one memory stored with code thereon, which when executed by said at least one processor, further causes the apparatus to: examine an amount of allocated memory with respect to non-allocated memory; and determine whether to select one or more cache elements to be evicted.

16. A non-transitory computer readable storage medium stored with code thereon for use by an apparatus, which when executed by a processor, causes the apparatus to:

initiate a process for handling a set of information, which includes one or more resources;

examine the set of information to determine whether the set of information includes a resource stored as a shareable cache element in a memory; and in an instance in which the set of information includes a resource stored as a shareable cache element in a memory, use the shareable cache element as said resource of the set of information;

said non-transitory computer readable storage medium stored with code thereon, when executed by said processor, further causes the apparatus to create and store in the memory a cache element header for the shareable cache element, the cache element header comprised of a plurality of fields, where a first field of the plurality of fields is an active references field comprised of a list of process identifiers of those processes that are currently using the sharable cache element, and where a second field of the plurality of fields is a stored references field comprised of a list of process identifiers of those processes that have previously used the sharable cache element.

17. The non-transitory computer readable storage medium of claim 16, where execution of said code by said processor further causes the apparatus to include at least one of the following fields in the cache element header:
a key as an identifier of the cache element,
a type of the cache element,
a type-specific metadata,
size of the cache element in the memory,
update time of the cache element, and
use time of the cache element.

18. The non-transitory computer readable storage medium of claim 16, where the stored references field identifies one or more processes that could benefit from retaining the sharable cache element in the memory, and where the stored references field is consulted during a cache entry eviction procedure.

19. The non-transitory computer readable storage medium of claim 16, where execution of said code by said processor further causes the apparatus to examine which cache elements are not used by any processes; and select one or more cache elements to be evicted from the cache elements which are not used by any processes.

20. The non-transitory computer readable storage medium of claim 16, where execution of said code by said processor further causes the apparatus, in response to deactivating a process having a process identifier in the list of process identifiers of the active references field, to remove the process identifier of the deactivated process from the list in the active references field and add the process identifier of the deactivated process to the list in the stored references field.

* * * * *